United States Patent Office

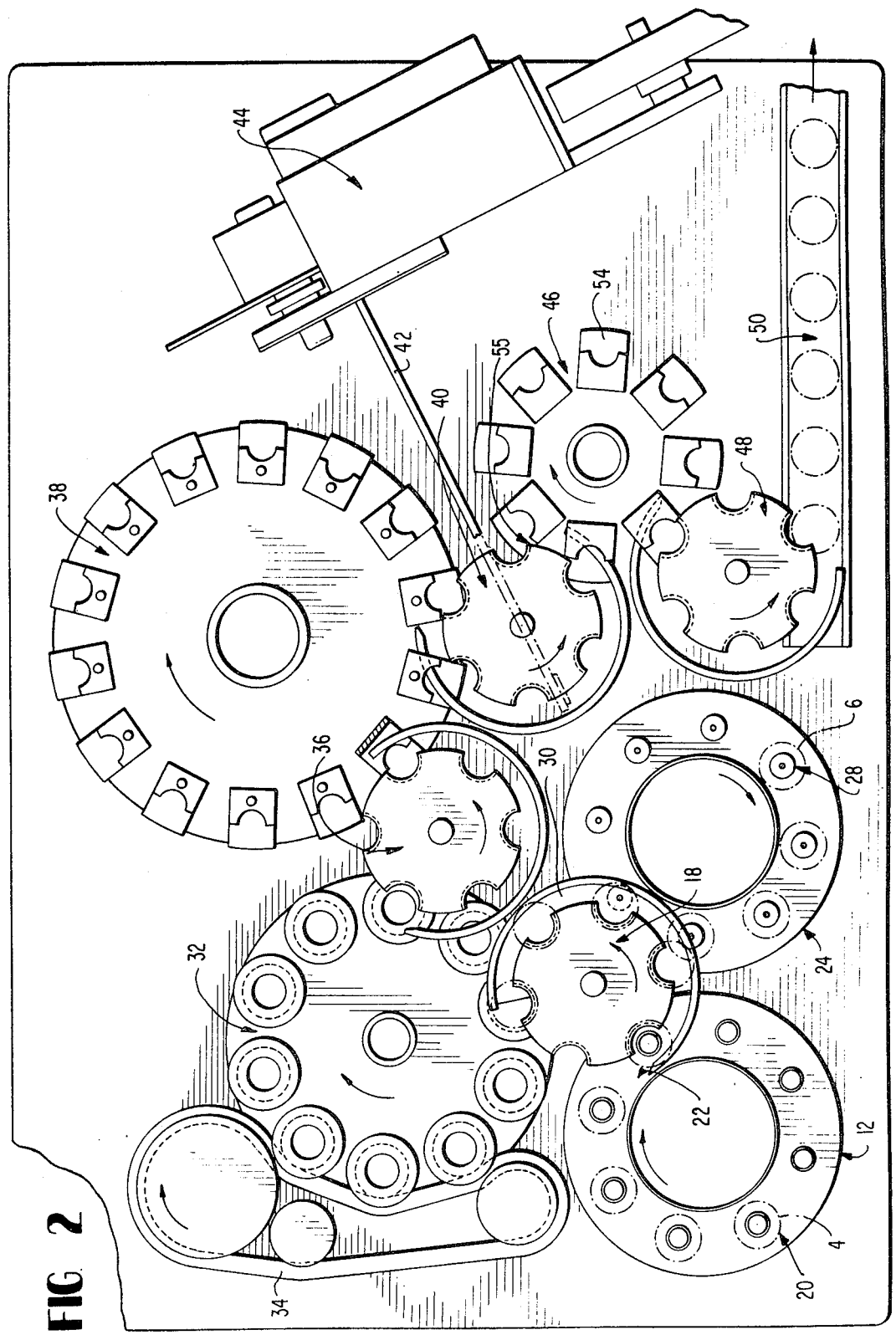

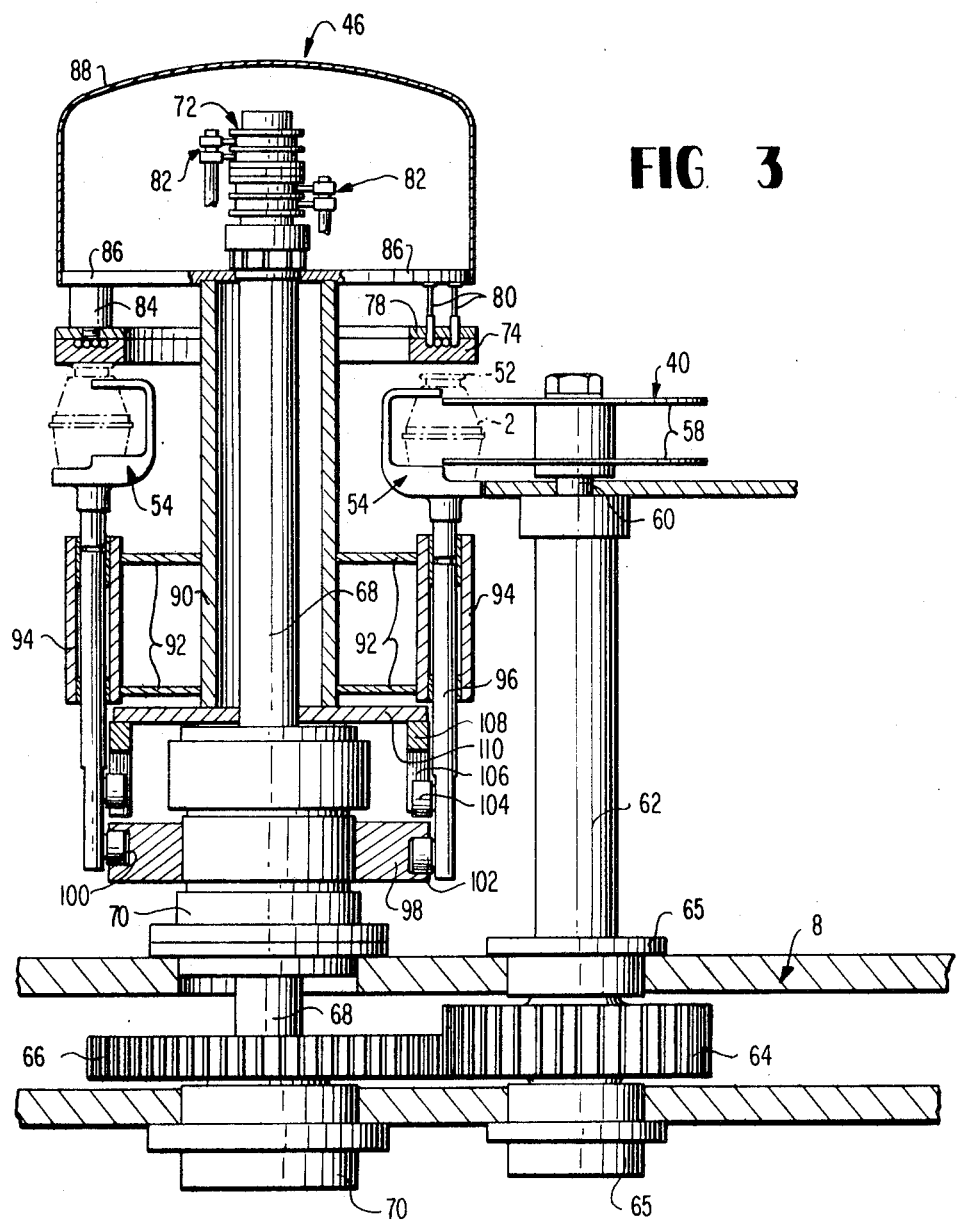

3,726,748
Patented Apr. 10, 1973

3,726,748
TRAPPED CAM ASSEMBLY
Robert J. Mistarz, Northbrook, and Albert B. Mojonnier, Sr., Chicago, Ill., assignors to Koehring Company, Milwaukee, Wis.
Filed June 17, 1971, Ser. No. 154,061
Int. Cl. B30b 13/34
U.S. Cl. 156—580     5 Claims

ABSTRACT OF THE DISCLOSURE

A bottling machine processing unit including a rotatable shaft assembly comprised of a plurality of generally vertically extending shafts slidably received in generally vertically extending sleeves. The sleeves and shafts are circumferentially spaced about the rotatable shaft assembly. Each shaft includes a shaft displacement cam follower adjacent one end thereof, and each shaft is cooperable with a portion of a container for general vertical positioning thereof. A stationary cam is provided for raising and lowering the shafts in the sleeves during rotation of the shaft assembly. The cam includes a stationary, annular and substantially closed cam track defined by upper and lower track boundaries for capturing each of the displacement cam followers within the confines of the track. At least one auxiliary, upwardly open ended slot communicates with the cam track for providing an escape path for selective removal of the followers from the confines of the cam track upon vertical lifting of the shaft members. Provision is made for preventing rotational movement of the shafts about their respective axes.

CROSS REFERENCE TO RELATED APPLICATIONS

The disclosure of this application is related to the applications of the present inventors filed concurrently herewith: Ser. No. 154,062, entitled "Heat Sealing Apparatus and Method"; Ser. No. 154,058, entitled "Automatic Plastic Bottling System and Method"; Ser. No. 154,060, entitled "Pedestal Assembly"; and Ser. No. 154,079, entitled "Jaw Operated Cup Dispensing Mechanism and Method."

BACKGROUND OF THE INVENTION

This invention relates generally to processing units of bottling machines wherein a rotatable shaft assembly is employed for cooperating with portions of containers for generally vertical positioning thereof. More particularly, this invention relates to facilitating assembly and disassembly of positively cam controlled shaft members of such a shaft assembly.

Stationary cam tracks such as indicated, for example, in U.S. Pat. No. 3,499,068 to G. W. Brown, have long been used with considerable success in processing units of bottling machines for cooperating with portions of containers for vertical positioning thereof. Such cam tracks may, for example, accurately vertically position thermoplastic container halves during a spin welding operation. The cam track is annular and extends around the central axis of a spin welding unit. Since the lower cam track is substantially as shown in the Brown patent is substantially open, the cam follower riding thereon and its associated shaft member may be easily removed by lifting the shaft members.

The easy removal of the cam followers and their associated shaft members is of particular importance in a milk bottling system. High standards of cleanliness in the milk industry require that the individual units, which are part of the bottling system, be thoroughly cleaned after relatively short periods of time.

It is, therefore, desirable to provide for disassembly and subsequent assembly of the shaft members of such a shaft assembly with relative ease.

During high speed operation, however, the cam followers may be caused to leave the open track, momentarily, when the track contour changes abruptly. For example, should the cam track suddenly curve downwardly, the cam follower travelling thereon may have a tendency to continue along its path of travel. Thus, the follower and shaft members attached thereto may be shifted to a higher vertical position than desired. Also, when the cam follower is caused to travel up an incline at a relatively high rate of speed, it may overshoot the top section of the incline before following the cam track again. Thus, the desirable control over the position of the container portions with which the shaft of the assembly cooperate may be somewhat hampered.

It would, therefore, be desirable to provide for positive control of the shafts in the assembly while still facilitating their disassembly and subsequent assembly.

SUMMARY OF THE INVENTION

This invention has as one of its objects the provision of a novel bottling machine processing unit where accurate and positive vertical positioning of shaft members of a rotatable shaft assembly is accomplished so that the shafts accurately cooperate with container portions in a high speed bottling system for vertical positioning thereof, while at the same time provision is made for facilitating assembly and disassembly of the shaft members.

A particular object of the invention is to provide in such a high speed bottling system an annular and substantially closed cam track which accurately vertically positions cam followers and attached shaft members of a rotatable shaft assembly while the shaft assembly is rotating about a central axis of the cam track, the cam track being provided with at least one auxiliary slot therein for facilitating removal of the cam followers and the associated shafts.

A preferred embodiment of the invention intended to accomplish at least some of the foregoing objects contemplates a bottling machine processing unit comprising a rotatable shaft assembly, disposed below and rotatable with a processing head assembly, with the shaft assembly being controlled by stationary cam means. The shaft assembly includes a plurality of circumferentially spaced and generally vertically extending shaft receiving sleeves along with a plurality of generally vertically extending shafts. Each of the shafts includes a shaft displacement cam follower adjacent one end thereof, and each shaft is slidably received in one of the sleeves. At their other ends, the shafts are each cooperable with a portion of a container for generally vertical positioning thereof. The processing head assembly disposed above and rotatable with the shaft assembly cooperates with vertically displaced shaft members to perform a processing operation in connection with the containers.

The stationary cam means is operative to raise and lower the shafts in the sleeves during rotation of the shaft assembly. The cam means includes a stationary, annular and substantially closed cam track defined by upper and lower track boundaries for capturing each of the cam followers within the confines thereof. Additionally, at least one auxiliary, upwardly open ended slot communicating with the cam track is provided so as to establish an escape path for removal of the shaft displacement cam followers from the confines of the cam track upon vertical lifting of the shaft members.

The shaft displacement followers are each comprised of a roller extending radially of the shaft assembly. Each of the rollers is received within the substantially closed cam track that may be provided by a stationary cam member having a generally cylindrical periphery grooved to define that cam track. The rollers are, in turn, received within the groove in the cam member.

Provision is made for preventing rotational movement of the shafts about their respective axes. For this purpose each shaft is provided with a shaft orientation follower adjacent the lower end of the shaft. A plurality of circumferentially spaced and generally vertically extending guide slots defined adjacent the orientation followers receive those followers. The cooperation of the guide slots with the orientation followers prevents rotational movement of the shafts about their respective axes.

A more complete understanding of these and other features and advantages of the invention will be gained from a consideration of the following detailed description of an embodiment illustrated in the accompanying drawings.

BRIEF DESCRIPTION OF THE DRAWINGS

FIG. 2 is a somewhat diagrammatic plan view of the machine of FIG. 1.

FIG. 3 is a vertical cross-sectional view of the bottle closure sealing unit of the machine of FIGS. 1 and 2.

FIG. 4 is a partial elevational view along line 4—4 of FIG. 3 and illustrating in greater detail features of the escape means and cam track of the invention as they may be provided in the sealing unit of FIG. 3.

DETAILED DESCRIPTION OF THE PREFERRED EMBODIMENT

Figure 1:
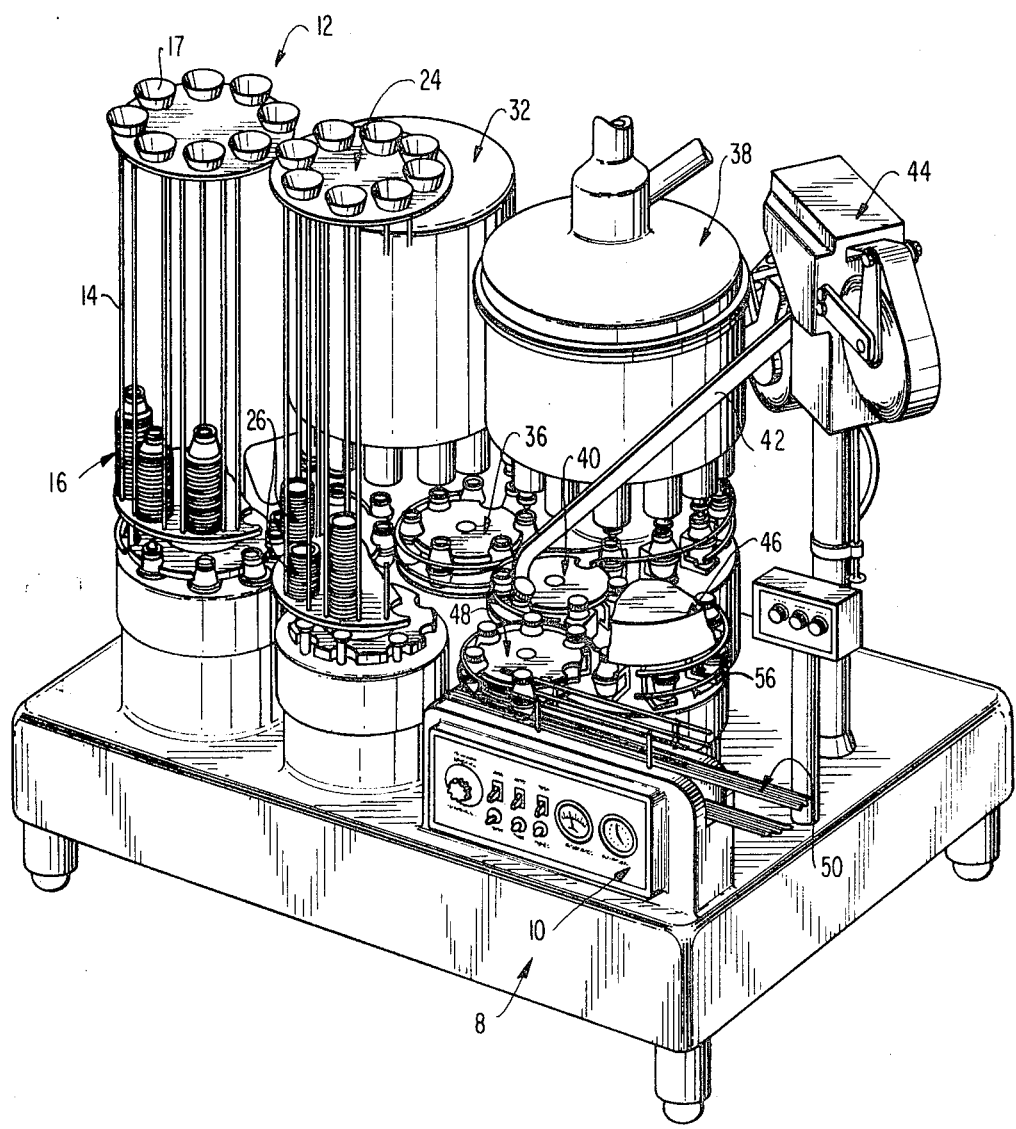
FIG. 1 is a perspective view of a machine making plastic milk bottles, filling the bottles, and heat sealing closures onto the tops of the bottles in accordance with the invention.

At the outset it will be helpful to describe generally the overall construction and operation of a milk bottling machine including a plurality of processing units embodying the present invention in which positive control of shafts comprising a rotatable shaft assembly is obtained while at the same time the shafts may be easily assembled or disassembled. Such a machine is illustrated in FIGS. 1 and 2.

This machine assembles plastic containers from bulk supplies of nested container halves, fills the containers, and caps and seals the open tops of the filled containers. The various constructional and operational features of the machine are disclosed in detail in the several patent applications referred to above and the disclosure of each of them is incorporated herein by reference.

The containers are of configurations generally similar to that shown in U.S. Design Pat. 204,710, and indicated at 2 in FIG. 3. These containers are assembled from separately fabricated container top halves 4 and container bottom halves 6, with the two halves of each container being frictionally welded together at the middle of the container.

The machine is in the form of a base or table structure 8 carrying thereon a control panel 10, a series of processing stations, or units, and means for transferring the container portions to and from the various processing stations. The processing stations are all rotatable units, and transfers between stations are accomplished through rotating star wheels, permitting the compact and efficient arrangement indicated in FIG. 1 of the drawings.

The first processing station of interest is that which supplies container top halves 4. This container top half supply unit or denester 12 includes means for holding eight vertical stacks 16 of nested container top halves 4 and for delivering container top halves therefrom, one at a time, for subsequent processing. As illustrated, groupings of vertical rods 14 establish the outlines for the several stacks 16 of nested container top halves. Additional container top halves may be supplied to each of the stacks 16 through funnel means 17 at the top of the unit 12. The several stacks 16 are arranged in a circle and the whole is rotated about the axis of this circle.

Means located below the stacks 16 of nested container top halves operate at one angular portion of the circle to remove the bottom container from each stack as that stack passes through such portion. According to the present invention, this removal is accomplished by utilizing a plurality of shaft members controlled by a stationary annular cam track cooperating with a cam follower on each shaft. The shaft members as a group rotate about the axis of the denester.

The removed container top half is transferred from the top denester unit 12 onto a star wheel device 18. This sequence is indicated in FIG. 2, wherein the top denester unit 12 is shown to be rotating in a clockwise direction and where a container top half portion 14 is indicated to have been removed from the bottom of one of the container stacks at one location 20 and transferred from the top denester 12 to the star wheel 18 at another angular location 22.

The container bottom halves are supplied from a unit 24 which is similar in its functions to the top container half supply unit or denester 12. Here again eight stacks 26 of nested container bottom halves 6 are located in a circular path and the stacks are revolved about the axis of this circle. As indicated in FIG. 2, the bottom denester 24 rotates in a clockwise direction, a container bottom half 6 is removed from the bottom of each stack 26 as that stack rotates past an angular location 28, and the individual container bottom halves 6 are transferred to the star wheel 18 in the zone of tangency between the units.

The star wheel 18 is, of course, a dual level device. The container top halves 4 are moved along an intermediately located support surface 30, while the container bottom halves 6 are disposed below the surface 30 but in vertical alignment with corresponding ones of the container top halves 4.

As the star wheel 18 rotates in a counterclockwise direction, it brings the vertically aligned container halves to a spin welder unit 32. Here the container halves 4 and 6 are received on individual holders and moved clockwise about a circular path. During one angular portion of this path, the holders for the container bottom halves are brought into contact with a drive belt 34 which serves to spin at high velocity about its own axis each of the container bottom halves which are captured within the holders. During this same time interval, the top edge of the container bottom half and the bottom edge of the container top half are brought together vertically into abutting relation. According to the present invention, this vertical movement of the container halves is controlled by a stationary annular cam track cooperating with shaft members each having cam followers thereon. One such shaft is associated with each set of holders for the container halves and the shaft members as a group rotate about the spin welder unit axis.

Since the container top half is not rotating about its own axis but a container bottom half is rotating in this fashion, a great deal of heat is generated by friction as the edges come into contact with each other. This heat serves to weld the thermoplastic material and provide a strong leakproof joint between the container edges at a location approximately in the middle of the joined container.

The joined container halves remain on the spin welder unit 32 for a sufficient time to permit adequate cooling of the newly formed joint. Then the containers are transferred one by one onto a star wheel unit 36 which delivers them to a filler unit 38.

The filler unit also is a rotating assembly. It receives the open topped containers at uniformly spaced locations about its periphery and revolves the containers through an arcuate path. A supply of the material, such as milk, to be introduced into the containers is located above the container support level of the unit; and as the containers move about the central axis of the unit they are raised individually into operative relationship to filler nozzle means which also rotate about the axis of the unit and which are disposed in vertical alignment with the container support stations. According to the present invention, such raising of the containers is accomplished by means of a stationary annular cam track cooperating with shaft members each having at least one cam follower thereon. One such shaft member is associated with each container support station and the shaft members as a group rotate about the unit axis.

As each container is brought into operative relationship to the overlying filler nozzle, a measured portion of milk begins to flow into the container. The time during which the container is allowed to remain in operative relationship to the filler nozzle may, for example, serve to establish the quantity of milk introduced into the container and may be controlled by the shape of the annular cam track. Thereafter, the container is lowered from contact with the filler nozzle and transferred from the filler unit 38 to another star wheel device 40.

While under the control of the star wheel device 40, each of the now filled containers passes beneath the end of a container closure or cap supply device 42. This device 42 receives caps formed in a mechanism 44 and disposes one such cap over the open top of each of the filled containers.

The filled containers with the caps resting thereon then move one by one onto the periphery of a heat sealer unit 46. This unit will be described in greater detail below. It will be sufficient here to point out that each container moves clockwise about the central vertical axis of the heat sealer unit 46, that each filled container is supported during such movement so as to prevent tipping and misalignment, and that each container cap is brought into contact with a heater to cause the cap to be sealed to the remainder of the top opening in the thermoplastic container.

According to the present invention, the container caps are brought into contact with the heater through control of a plurality of shaft members, each having a holder for the filled container on the upper end thereof. Adjacent the other end, each shaft is provided with a cam follower cooperating with a stationary annular cam track for controlling shaft movement. The shafts as a group are rotated about the heat sealer unit axis.

After sealing, the sealed filled containers are delivered from the heat sealer unit 46 onto a star wheel device 48 and transferred to a delivery conveyor 50. The delivery conveyor 50 carries the filled and sealed containers to another location for such further processing as may be desirable in arranging them for shipment or the like.

Having described generally the overall arrangement and operation of the bottling machine of FIGS. 1 and 2, it will be helpful to refer now to the constructional features of the heat sealing apparatus 46, with which the trapped cam assembly of the invention may be utilized as illustrated in greater detail in FIG. 3 of the drawings. While the trapped cam assembly is described with reference to the heat sealer 46, it is also similarly employed in the top and bottom denesters 12 and 35, in the spin welder 32, and in the filler unit 38.

As will be apparent, the filled plastic containers 2 with closure members or caps 52 resting thereon are delivered from the star wheel 40 onto individual container holders 54 each mounted for movement in a circular path about the central axis of the sealer unit 46. Such transfer takes place, of course, at the angular zone 55 (FIG. 2) where the star wheel periphery moves into a position of tangency to the path followed by the several holders 54, and the transfer is assisted by conventional stationary guide rails 56 partially illustrated in FIG. 1. The entrance end portions of the guide rails 56 intersect the path of the containers on the star wheel 40 and the containers to be shifted onto the holders 54 rather than permitting them to continue to move about the axis of the star wheel.

The star wheel device 40 includes upper and lower generally circular plates 58 having cutouts at their peripheries for engaging the outer peripheries of the containers 2. These plates 58 are carried by a shaft 60 extending through a stationary cylindrical member 62 and connected at its lower end portion to a drive gear 64. This shaft 60 is journalled within bearing means carried by the frame or table 8 and indicated generally 65 in FIG. 3.

The star wheel drive gear 64 in turn meshes with a heat sealer drive gear 66 attached to a hollow drive shaft 68 extending upwardly through the center of the heat sealer unit 46. This hollow shaft is rotatable in bearing means within housings 70 on the frame 8, and within the rotating shaft 68 there is another shaft (not shown) which is attached to the lower bearing housing 70 and held stationary thereby.

At its upper end the center stationary shaft supports a stationary armature assembly 72 which is a part of an electrical supply system for the heater means of the unit. The heater means of the heat sealer unit 46 may be considered to be a rotatable processing head assembly. This heater includes an annular member 74 of some appropriate heat conducting material such as aluminum. Electrical resistance means 76 extend entirely around the upper portion of the annular member 74 and are secured in place by an overlying plate 78 attached to the annular member 74 by suitable screw means or the like. Leads 80 extend upwardly from the electrical resistance means 76 and are connected electrically to brush devices 82 cooperating with the stationary armature assembly 72.

The annular heater made up of the members 74 and 78 and the resistance means 76 is connected to a plurality of posts 84 which extend downwardly from a base plate 86 of a dome structure 88 at the top of the heat sealing unit 46. This base plate 86 is attached to the rotating shaft 68. In this fashion the process head assembly, i.e. the heater means, is rendered rotatable about the central axis of the heat sealer unit and is held at a predetermined level above the frame 8 of the machine. The base plate 86 of the dome structure also serves to support the brush devices 82 and cause them to rotate about the armature assembly 72 as the shaft 68 rotates.

With this arangement, it will be seen that the lower surface of the annular heater member 74 does not move up or down but does move about the axis of the shaft 68 at the same rate that the shaft itself rotates. The electrical resistance means 76 also rotates about the axis of the shaft 68 and is continuously supplied with power through the brushes 82.

Also attached to the base plate 86 of the dome structure 88 is a depending sleeve 90 coaxial with the central shaft 68. Strut means 92 extend generally radially outwardly from the sleeve 90 at locations spaced about the axis thereof to support hollow cylindrical members, or shaft receiving sleeves 94. These cylindrical members 94 are spaced regularly about the central axis of the unit and each of them is disposed beneath a portion of the heater 74.

Within each of the cylindrical members 94 there is slidably received a shaft member 96 which protrudes below the lower end of the cylindrical member. A stationary cam member 98 is attached to the upper bearing housing 70 and has a cam track 100 at its periphery for cooperating with shaft displacement cam follower rollers 102 carried by the lower end portions of the several shaft members 96. This cam track 100 is shaped to cooperate with the captured follower rollers 102 so as to move each of the shaft members 96 up and then down during each revolution of the group of shaft members about the central axis of the central shaft 68 of the unit.

Each of the shaft members 96 also carries a shaft orientation guide roller or follower 104 which rides in a vertical slot 106 provided in a member 108 secured to a plate 110 attached to the lower end of the rotating sleeve 90 and rotatable therewith. As will be apparent, the plate 110 with the slots 106 and the cylindrical shaft receiving members 94 are rotated as a unit through rotation of the sleeve 90 about the axis of the central shaft. The disposition of the guide rollers 104 within the vertical guide slots 106 prevents the shaft members 96 from rotating about their own individual axes during operation of the machine. In this fashion, inadvertent rotation of each shaft member 96 about its own axis, which might otherwise move the associated cam follower roller 102 out of the desired relationship with respect to the cam track 100, is prevented.

Referring now to FIG. 4, there is shown a partial side elevational view of the cam track 100 within which the cam follower rollers 102 are captured. As will be appreciated, the rollers 102 rotate about their own axes during guided travel around the cam track in which they are disposed. This cam track is formed in the cam member 98 by grooving the generally cylindrical periphery of that cam member to define the cam track. The cam track is, of course, contoured for vertically positioning the shaft members 96. In this fashion, a stationary, annular and substantially closed cam track defined by upper and lower track boundaries is provided for capturing each of the cam followers within the confines thereof.

This track, as can be appreciated, may have relatively straight sections at 112 as well as curved profile portions indicated at 114. During high speed rotational movement of the cam follower roller 102 within the cam track 100, accurate and positive vertical positioning of the shaft members 96 and rollers 102 is caused by the cam track being substantially closed. Thus, even at the curved cam track portions 114, the cam follower is properly positioned by the track, thereby avoiding container deformation which could otherwise be caused if the containers were located by the shaft in a heat sealing elevation for more time than would be desirable. Formation of improperly sealed containers, which could otherwise result from heat sealing for less than a desired time, is also minimized by the substantially closed cam track.

According to the present invention, provision is made for selective disassembly and subsequent assembly of the shaft 96 for cleaning, repair and adjustment purposes or the like. For this purpose, the cam track communicates with at least one upwardly open ended auxiliary slot 110 extending generally upwardly from and intersecting the track 100. Upon vertical lifting of the shaft members positioned adjacent the auxiliary slot 110, the follower rollers 102 are removed from the confines of the cam track. Thus, it may be seen that the slot 110 provides an escape path for selective removal of the cam followers 102 and the associated shaft.

By providing additional slots 110 at selected positions about the cam track 100, the cam followers may be selectively removed at additional locations from the normally entrapping track 100. The plurality of escape slots 110 may be provided at positions corresponding to the container spacing shown in FIG. 2. With such an arrangement, the group of shafts 96 forming the shaft assembly may be rotated so that all of the cam followers are in alignment with a respective slot 110, and then the entire rotatable assembly may be removed.

The slot 110 is shown in FIG. 4 as being positioned centrally of a generally straight cam track section indicated at 112. It will be appreciated that the tendency of the cam followers to move upwardly within the escape slot 110 during rotation of the shaft assembly may be minimized by such positioning of the escape slot 110, although other locations of escape slots may be envisioned.

From the foregoing it may be seen that the heat sealer processing unit 46 includes a rotatable shaft assembly, a stationary cam and a rotatable processing head assembly. The shaft assembly includes a plurality of circumferentially spaced and generally vertically extending shaft receiving sleeves 94. A plurality of generally vertically extending shafts 96 are slidably received in the sleeves 94. Each of the shafts includes one of the shaft displacement cam followers 102 adjacent one end thereof. The shafts are each cooperable with a portion of a container for generally vertical positioning thereof.

The processing head assembly comprised of the heating unit is rotatable with the shaft assembly and is located thereabove. The processing head assembly cooperates with a raised shaft member to perform a processing operation, in this case a sealing operation, on a portion of a container.

The stationary cam 98 is operative to raise and lower the shafts 96 in the sleeves 94 during rotation of the shaft assembly. Included in the stationary cam is the stationary, annular and substantially closed cam track 100 defined by upper and lower track boundaries for capturing each of the cam followers within the confines thereof. In addition, at least one auxiliary, upwardly open ended slot 110 communicates with the cam track 100 for providing an escape path for removal of the shaft displacement followers 102 from the confines of the cam track 100 upon vertical lifting of the shaft members 96.

A shaft orientation follower 104 has been provided adjacent one end of each of the shafts 96. These followers 104 cooperate with a plurality of adjacently positioned, circumferentially spaced and generally vertically extending guide slots forming a portion of the shaft assembly. The guide slots cooperate with the orientation followers 104 for preventing rotational movement of the shafts 96 about their respective axes.

It will be appreciated that each of the other processing units is similarly arranged. However, the processing head assembly in each of the units performs a different function peculiar to that unit. For example, at the denester, the processing head assembly performs a denesting supply function. Similarly, the vertical positioning of a container portion through vertical positioning of the shafts is provided at each processing unit for a purpose peculiar to that unit. For example, at the denester, a denesting operation is envisioned with vertical positioning of the shafts.

It will, however, be seen that each of the processing units provides for positive and accurate control of shaft displacement during rotation of the shaft assembly through the use of the substantially closed cam track. At the same time each unit is constructed to facilitate easy disassembly and subsequent assembly of the shafts 96 in the rotatable shaft assembly.

Although a single embodiment of the invention has been illustrated and described in detail, it will be evident that additions, modifications, substitutions and deletions may be made without departing from the spirit and scope of the invention as defined in the appended claims.

What is claimed is:

1. A container machine processing unit comprising:
   a rotatable shaft assembly including:
      a plurality of circumferentially spaced and generally vertically extending shaft receiving sleeves; and
      a plurality of generally vertically extending shafts, each of said shafts including a shaft displacement cam follower adjacent one end thereof and being slidably received in one of said sleeves, said shafts at their other ends being each cooperable with a portion of a container for generally vertical positioning thereof; and
   stationary cam means for raising and lowering said shafts in said sleeves during rotation of said shaft assembly, said cam means including:
      a stationary, annular cam track defined by upper and lower track boundaries for capturing each of said cam followers within the confines thereof; and
      at least one auxiliary, upwardly open ended slot communicating with said cam track for providing a path for removal of said followers from the confines of said cam track upon vertical lifting of said shaft members.

2. The container machine processing unit according to claim 1 wherein said rotatable shaft assembly further includes:
   a shaft orientation follower adjacent said one end of each of said shafts; and
   a plurality of circumferentially spaced and generally vertically extending guide slots defined adjacent and receiving said orientation followers, said guide slots cooperating with said orientation followers for preventing rotational movement of said shafts about their respective axes.

3. The container machine processing unit according to claim 1 wherein:
   said shaft displacement followers are each comprised of a roller extending radially of said shaft assembly; and wherein
   said cam means includes a stationary cam member having a generally cylindrical periphery grooved to define said cam track, said rollers being received within the groove in said cam member.

4. A container machine processing unit comprising a rotatable shaft assembly including:
   a plurality of circumferentially spaced and generally vertically extending shaft receiving sleeves;
   a plurality of generally vertically extending shafts, each of said shafts including a shaft displacement cam follower and a shaft orientation cam follower adjacent one end thereof and being slidably received in one of said sleeves, said shafts at their other ends being each cooperable with a portion of a container for generally vertical positioning thereof; and
   a plurality of circumferentially spaced and generally vertically extending guide slots defined adjacent and receiving said orientation followers, said guide slots cooperating with said orientation followers for preventing rotational movement of said shafts about their respective axes; and
stationary cam means for raising and lowering said shafts in said sleeves during rotation of said shaft assembly, said cam means including:
   a stationary, annular and substantially closed cam track defined by a groove in a generally cylindrical periphery of a cam member, for capturing each of said cam followers within the confines of said groove; and
   at least one auxiliary, upwardly open ended slot communicating with said cam track for providing a path for selective removal of said followers from the confines of said cam track upon vertical lifting of said shaft members.

5. A container machine processing unit comprising:
a rotatable shaft assembly including:
   a plurality of circumferentially spaced and generally vertically extending shaft receiving sleeves, and
   a plurality of generally vertically extending shafts, each said shaft including a shaft displacement cam follower adjacent one end thereof and being slidably received in one of said sleeves, said shafts being each cooperable with a portion of a container for generally vertical positioning thereof;
a rotatable processing head assembly rotatable with said shaft assembly and disposed thereabove, said head assembly being cooperable with a raised shaft member to perform a processing operation on a portion of a container;
stationary cam means for raising and lowering said shafts in said sleeves during rotation of said shaft assembly, said cam means including:
   a stationary, annular and substantially closed cam track cooperating with said displacement cam followers; and
   at least one auxiliary, upwardly open ended slot communicating with said cam track for facilitating assembly and disassembly of said shaft members.

References Cited
UNITED STATES PATENTS

| | | | |
|---|---|---|---|
| 2,399,592 | 4/1946 | Bradshaw | 264—68 |
| 3,499,068 | 3/1970 | Brown | 264—68 |
| 3,340,795 | 9/1967 | Hartley | 156—580 |
| 3,580,460 | 5/1971 | Lipschutz | 156—580 |

DAVID KLEIN, Primary Examiner

J. L. GOODROW, Assistant Examiner

U.S. Cl. X.R.

156—583; 264—68